United States Patent
Theodore

(10) Patent No.: US 8,828,230 B2
(45) Date of Patent: Sep. 9, 2014

(54) WASTEWATER TREATMENT METHOD FOR INCREASING DENITRIFICATION RATES

(75) Inventor: Marcus G. Theodore, Salt Lake City, UT (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 436 days.

(21) Appl. No.: 13/385,444

(22) Filed: Feb. 21, 2012

(65) Prior Publication Data

US 2012/0217202 A1    Aug. 30, 2012

Related U.S. Application Data

(60) Provisional application No. 61/464,146, filed on Feb. 28, 2011.

(51) Int. Cl.
*C02F 3/00* (2006.01)
*C02F 3/30* (2006.01)

(52) U.S. Cl.
CPC .................................... *C02F 3/302* (2013.01)
USPC ............ 210/610; 210/620; 210/631; 210/710

(58) Field of Classification Search
USPC .................. 210/610, 620, 631, 710
See application file for complete search history.

(56) References Cited

U.S. PATENT DOCUMENTS

| 4,070,279 | A | * | 1/1978 | Armstrong | 210/629 |
| 5,350,516 | A | * | 9/1994 | Bhadra | 210/602 |
| 7,416,668 | B1 | * | 8/2008 | Theodore | 210/603 |
| 7,429,329 | B2 | * | 9/2008 | Theodore | 210/607 |
| 7,455,773 | B1 | * | 11/2008 | Harmon et al. | 210/603 |
| 7,563,372 | B1 | * | 7/2009 | Theodore | 210/609 |
| 7,566,400 | B2 | * | 7/2009 | Harmon et al. | 210/631 |
| 7,867,398 | B2 | * | 1/2011 | Harmon et al. | 210/604 |
| 8,702,986 | B2 | * | 4/2014 | Theodore | 210/602 |
| 2008/0314827 | A1 | * | 12/2008 | Theodore | 210/607 |
| 2009/0294354 | A1 | * | 12/2009 | Theodore et al. | 210/602 |

OTHER PUBLICATIONS

Bio-solids Management: An Environmentally Sound Approach for Managing Sewage Treatment Plant Sludg:, UN Env. Programm Div. of Tech, Ind., and Econ. News.,Freshwater Ser. 1.
Wikipedia, "Bacteria", http://en.wikipedia.org/wiki/Bacteria.
Wikipedia, "Baterial Growth", http://en.wikipedia.org/wiki/Bacterial_growth.
Wastewater Treatment with Methanol Denitrification; Methanol Institute, Chesapeake Bay Foundation, www.methanol.org.

* cited by examiner

*Primary Examiner* — Chester Barry
(74) *Attorney, Agent, or Firm* — Marcus G. Theodore

(57) ABSTRACT

A method of conditioning, separating, drying, and comminuting sulfurous acid treated wastewater suspended solids for addition to aerobic and anaerobic digesters to provide electron donor carbon and sulfur compounds to increase the removal rate of ammonia, nitrates/nitrites, and BOD compounds.

5 Claims, No Drawings

WASTEWATER TREATMENT METHOD FOR INCREASING DENITRIFICATION RATES

RELATED APPLICATIONS

This application is dependent upon provisional patent application No. 61/464,146 filed Feb. 28, 2011 entitled "Wastewater Treatment Method for Increasing Denitrification Rates.

BACKGROUND OF THE INVENTION

1. Field

This invention relates to wastewater treatment methods for increasing denitrification rates of aerobic and anaerobic digesters. More particularly, it comprises a method of conditioning, separating and comminuting sulfurous acid treated suspended solids for addition to aerobic and anaerobic digesters to provide electron donor carbon and sulfur compounds to increase the removal rate of ammonia, nitrates/nitrites, and BOD compounds.

2. State of the Art

Various types of wastewaters are known. As used herein, it is principally directed to treat wastewater process streams containing organic and macronutrients having already undergone primary and secondary treatment according to conventional wastewater treatment plant processes.

One source of wastewater is that present in sewage treatment gathering systems, which are processed by various methods. Most large municipal systems employ a series of settling ponds sequentially concentrating the solids contained in wastewater either with or without polymers for separation from liquids via mechanical separation means, such as belt presses. To produce a clean effluent that can be safely discharged to watercourses, wastewater treatment operations use three or four distinct stages of treatment to remove harmful contaminants; according to the United Nations Environmental Programme Division of Technology, Industry, and Economics Newsletter and Technical Publications Freshwater Management Series No. 1, "Bio-solids Management: An Environmentally Sound Approach for Managing Sewage Treatment Plant Sludge".

Preliminary wastewater treatment usually involves gravity sedimentation of screened wastewater to remove settled solids. Half of the solids suspended in wastewater are removed through primary treatment. The residual material from this process is a concentrated suspension called primary sludge, subsequently undergoing additional treatment to become bio-solids.

Secondary wastewater treatment is accomplished through a biological process, removing biodegradable material. This treatment process uses microorganisms to consume dissolved and suspended organic matter, producing carbon dioxide and other by-products. The organic matter benefits by providing nutrients needed to sustain the communities of microorganisms. As microorganisms feed, their density increases and they settle to the bottom of processing tanks, separated from the clarified water as a concentrated suspension called secondary sludge, biological sludge, waste activated sludge, or trickling filter humus. By breaking down the sludge, the wastewater system loses energy and increases carbon dioxide emissions.

Tertiary or advanced treatment is used when extremely high-quality effluent is required, including direct discharge to a drinking water source. The solid residual collected through tertiary treatment consists mainly of chemicals added to clean the final effluent, which are reclaimed before discharge, and therefore not incorporated into bio-solids. Tertiary or advanced treatment does not reduce the treated wastewater brine content, requiring energy intensive Quaternary brine treatment removal using reverse osmosis and distillation, and other methods.

Combined primary and secondary solids comprise the majority of material used at municipal plants for bio-solids production. Careful management throughout the entire treatment process allows plant operators to control the solids content, nutrient value and other constituents of bio-solids.

Biological treatment is used to remove ammonia through bacterial degradation. Wikipedia explains that "Denitrification is a microbially facilitated process of nitrate reduction that may ultimately produce molecular nitrogen ($N_2$) through a series of intermediate gaseous nitrogen oxide products. This respiratory process reduces oxidized forms of nitrogen in response to the oxidation of an electron donor such as organic matter. The preferred nitrogen electron acceptors in order of most to least thermodynamically favorable include nitrate ($NO_3^-$), nitrite ($NO_2^-$), nitric oxide (NO), and nitrous oxide ($N_2O$). In terms of the general nitrogen cycle, denitrification completes the cycle by returning $N_2$ to the atmosphere. The process is performed primarily by heterotrophic bacteria (such as *Paracoccus denitrificans* and various pseudomonads), although autotrophic denitrifiers have also been identified (e.g., *Thiobacillus denitrificans*). Denitrifiers are represented in all main phylogenetic groups. Generally several species of bacteria are involved in the complete reduction of nitrate to molecular nitrogen, and more than one enzymatic pathway has been identified in the reduction process.

Direct reduction from nitrate to ammonium, a process known as dissimilatory nitrate reduction to ammonium or DNRA, is also possible for organisms that have the nrf-gene. This is less common than denitrification in most ecosystems as a means of nitrate reduction. Other genes known in microorganisms which denitrify include nir (nitrite reductase) and nos (nitrous oxide reductase) among others; organisms identified as having these genes include *Alcaligenes faecalis*, *Alcaligenes xylosoxidans*, many in the *Pseudomonas* genus, *Bradyrhizobium japonicum*, and *Blastobacter denitrificans*.

. . . Denitrification takes place under special conditions in both terrestrial and marine ecosystems. In general, it occurs where oxygen, a more energetically favorable electron acceptor, is depleted, and bacteria respire nitrate as a substitute terminal electron acceptor. Due to the high concentration of oxygen in our atmosphere, denitrification only takes place in environments where oxygen consumption exceeds the rate of oxygen supply, such as in some soils and groundwater, wetlands, poorly ventilated corners of the ocean, and in seafloor sediments.

Denitrification generally proceeds through some combination of the following intermediate forms:

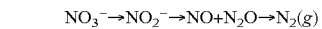

$$NO_3^- \rightarrow NO_2^- \rightarrow NO + N_2O \rightarrow N_2(g)$$

The complete denitrification process can be expressed as a redox reaction:

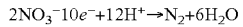

$$2NO_3^- 10e^- + 12H^+ \rightarrow N_2 + 6H_2O$$

The present invention described below proposes to drive this reaction using sulfurous acid treated solids producing sulfites and bisulfites and carbon as electron donors, while providing a growth substrate for certain biofilm bacteria, such as *Nitrosomonas* and *Nitrobacter* bacteria.

" , , , Denitrification is commonly used to remove nitrogen from sewage and municipal wastewater.

Reduction under anoxic conditions can also occur through process called anaerobic ammonia oxidation (anammox):

$$NH_4^+ + NO_2^- \rightarrow N_2 + 2H_2O$$

"Carbon metabolism in bacteria is either heterotrophic, where organic carbon compounds are used as carbon sources, or autotrophic, meaning that cellular carbon is obtained by fixing carbon dioxide. Heterotrophic bacteria include parasitic types. Typical autotrophic bacteria are phototrophic cyanobacteria, green sulfur-bacteria and some purple bacteria, but also many chemolithotrophic species, such as nitrifying or sulfur-oxidising bacteria. Energy metabolism of bacteria is either based on phototrophy, the use of light through photosynthesis, or on chemotrophy, and the use of chemical substances for energy, which are mostly oxidised at the expense of oxygen or alternative electron acceptors (aerobic/anaerobic respiration).

Finally, bacteria are further divided into lithotrophs that use inorganic electron donors and organotrophs that use organic compounds as electron donors. Chemotrophic organisms use the respective electron donors for energy conservation (by aerobic/anaerobic respiration or fermentation) and biosynthetic reactions (e.g. carbon dioxide fixation), whereas phototrophic organisms use them only for biosynthetic purposes. Respiratory organisms use chemical compounds as a source of energy by taking electrons from the reduced substrate and transferring them to a terminal electron acceptor in a redox reaction. This reaction releases energy that can be used to synthesize ATP and drive metabolism. In aerobic organisms, oxygen is used as the electron acceptor. In anaerobic organisms other inorganic compounds, such as nitrate, sulfate or carbon dioxide are used as electron acceptors. This leads to the ecologically important processes of denitrification, sulfate reduction and acetogenesis, respectively."; see Wikipedia, "Bacteria"//en.wikipedia.org/wiki/Bacteria.

As stated in Wikipedia, "Bacterial Growth", //en.wikipedia.org/wiki/Bacterial_growth, bacterial growth to consume nutrients is a binary fission process with four different phases:

"In autecological studies, bacterial growth in batch culture can be modeled with four different phases: lag phase (A), exponential or log phase (B), stationary phase (C), and death phase (D):

1. During lag phase, bacteria adapt themselves to growth conditions. It is the period where the individual bacteria are maturing and not yet able to divide. During the lag phase of the bacterial growth cycle, synthesis of RNA, enzymes and other molecules occurs. So in this phase the microorganisms are not dormant.

2. Exponential phase (sometimes called the log phase or the logarithmic phase) is a period characterized by cell doubling. The number of new bacteria appearing per unit time is proportional to the present population. If growth is not limited, doubling will continue at a constant rate so both the number of cells and the rate of population increase doubles with each consecutive time period. For this type of exponential growth, plotting the natural logarithm of cell number against time produces a straight line. The slope of this line is the specific growth rate of the organism, which is a measure of the number of divisions per cell per unit time. The actual rate of this growth (i.e. the slope of the line in the figure) depends upon the growth conditions, which affect the frequency of cell division events and the probability of both daughter cells surviving. Under controlled conditions, cyanobacteria can double their population four times a day. Exponential growth cannot continue indefinitely, however, because the medium is soon depleted of nutrients and enriched with wastes.

3. During stationary phase, the growth rate slows as a result of nutrient depletion and accumulation of toxic products. This phase is reached as the bacteria begin to exhaust the resources that are available to them. This phase is a constant value as the rate of bacterial growth is equal to the rate of bacterial death.

4. At death phase, bacteria run out of nutrients and die.

This basic batch culture growth model draws out and emphasizes aspects of bacterial growth which may differ from the growth of macrofauna. It emphasizes clonality, asexual binary division, the short development time relative to replication itself, the seemingly low death rate, the need to move from a dormant state to a reproductive state or to condition the media, and finally, the tendency of lab adapted strains to exhaust their nutrients.

In reality, even in batch culture, the four phases are not well defined. The cells do not reproduce in synchrony without explicit and continual prompting (as in experiments with stalked bacteria) and their exponential phase growth is often not ever a constant rate, but instead a slowly decaying rate, a constant stochastic response to pressures both to reproduce and to go dormant in the face of declining nutrient concentrations and increasing waste concentrations.

To accelerate denitrification, it is therefore necessary to continually supply growth nutrients for denitrifying bacteria. In some wastewater treatment plants, small amounts of methanol, ethanol, acetate or proprietary products like MicroCg or MicroCglycerin are added to the wastewater to provide a carbon source for the denitrification bacteria. Methanol (CH3OH) serves as a carbon source for bacterial microbes Accelerated by the addition of methanol, anaerobic bacteria convert the nitrate to nitrogen gas, which is vented into the atmosphere.

Inventors Charles B. Bott, Ph.D. and Professor Robert Nerenberg propose to drive anoxic denitrification reactions using sulfurous acid producing sulfites and bisulfites as electron donors.

Today, wastewater treatment plants around the United States are using methanol in their denitrification process. One of the larger plants in the country, the Blue Plains Wastewater Treatment Facility, has had one of the best success stories related to methanol denitrification. Blue Plains, which serves the metropolitan Washington, D.C. area, releases nearly 350 million gallons of treated wastewater to the Potomac River each day. The Potomac flows into the Chesapeake Bay, the largest estuary in the United States. As a result of its size, the Blue Plains Wastewater Treatment Facility is the single largest point source of nitrogen for the Bay, at 20 tons of nitrogen per day. Methanol denitrification helped to reduce that number to 10 tons per day, half its original nitrogen discharge. The use of methanol denitrification at Blue Plains has resulted in a 30% drop in nitrogen levels in the Chesapeake Bay, from just one treatment plant.

Unfortunately, methanol, ethanol, and acetate are expensive. For example, methanol denitrification costs about $0.50 to $0.60 per pound of nitrogen removed for Blue Plains. Average nitrogen removal costs in the Chesapeake basin have been reported to be about $4 per pound, according to EPA Chesapeake Bay Program officials; see Methanol Institute; Chesapeake Bay Foundation, www.methanol.org.

Thus, there remains a need for a method to chemically treat wastewater undergoing bacterial denitrification with an inexpensive carbon and sulfur electron donor compound to expedite denitrification. The treatment method described below provides such an invention.

SUMMARY OF THE INVENTION

The present invention comprises a method for increasing denitrification rates employing chemical dewatered sewage solids to enhance biological denitrification with an inexpensive carbon and sulfur electron donor compound. The present method uses modular equipment that can be rapidly installed at an existing wastewater treatment plant for chemical self agglomeration of the suspended solids using sulfurous acid for removal. The heavy metals and phosphates are acid leached from the suspended solids into the liquid fraction, leaving a cheap carbon/sulfur source of electron donor compounds to enhance bacteria breakdown of ammonia compounds and BOD's in bacterial reactors.

METHOD

The method comprises chemically treating the wastewater containing solids, biomass/algae nutrients, and heavy metals with sulfur dioxide to condition the wastewater and separate the solids. Injecting sulfur dioxide ($SO_2$) into wastewater creates sulfurous acid ($H_2SO_3$), which dissociates to produce $H^+$, bi-sulfite ($HSO_3^-$), sulfite ($SO_3^=$), and free $SO_2$ species (all hereinafter referred to as sulfurous acid) on the solids. The sulfurous acid disinfects and acid leaches the heavy metals from the solids into the liquid phase containing the ammonia and phosphorous compounds. Consequently the acid treated solids primarily contain carbon, acid, and sulfite/sulfate electron donor species.

Conditioning of the solids in this manner is defined as treating the filtered solids with sufficient $SO_2$ ensuring they will chemically dewater when allowed to drain, forming a fairly dry solid (less than 10% water content) with a BTU content approximating that of wood chips or shavings. Conditioning of the solids generally results in a color change of the solids from a dark brown to a lighter gray brown color. These chemically dewatered solids are then pulverized into a fine powder to expand their surface area before addition to bacterial reactors.

When added to a bacterial reactor, the powdered chemically dewatered solids provide a shade screen from ultra violet light sources (UV) to encourage the growth of certain bacteria, such as *Nitrosomonas* and *Nitrobacter* bacteria, which grow in the dark. The pulverized powder also increases surface support area to provide a platform for bacteria to grow, while better exposing the solids' carbon with sulfur electron donor compounds. As some residual acid is present, it may also be used for pH adjustment for optimal growth conditions.

If too much acid is present for a given bacteria, it may be pH adjusted with the addition of alkaline reagents to provide a pH between 6.0 and 9.0. For example, *Nitrosomonas* and *Nitrobacter* bacteria require a pH of between 6.0 and 8.5, if higher pH levels are required lime, spent lime ($CaCO_3$), calcium hydroxide, sodium hydroxide, etc. may be added. Spent lime has the advantage of also being a carbon donor, and is a waste byproduct of sugar beat processing.

For most wastewaters undergoing bacteriological treatment, the biological removal of ammonia and nitrates/nitrites via *Nitrosomonas* and *Nitrobacter* bacteria may be sufficient. The *Nitrosomonas* and *Nitrobacter* bacteria when contained in a dark aerated bioreactor environment, such as the submersible opaque biofilm domes placed in open impoundments produced under the tradename BioDomes™ produced by Wastewater Compliance Systems, Inc. of Salt Lake City, Utah for removal of BOD's, ammonia and nitrates/nitrites, and some pharmaceuticals, as they grow. These concentric plastic half domes are separated with a growth media upon which the *Nitrosomonas* and *Nitrobacter* bacteria growth removes BOD's, ammonia, and nitrates/nitrites from water. A continuous source of air is circulated through these concentric half domes to circulate the water to be treated to expedite growth of these bacteria, while preventing algae growth in the darkened conditions. The two principle genera of *Nitrosomonas* and *Nitrobacter* bacteria remove ammonia nitrogen by oxidizing ammonium to nitrate with the intermediate formation of nitrite:

$$2NH_4^+ + 3O_2 \rightarrow 2NO_2^- + 4H^+ + 2H_2O^+ \text{ energy (Nitrosomonas)}$$

$$2NO_2^- + O_2 \rightarrow 2NO_3^- + \text{energy (Nitrobacter)}$$

for an overall reaction of $$NH_4^+ + 2O_2 \rightarrow NO_3^- + 2H^+ + H_2O + \text{energy}$$

The nitrates/nitrites are then biologically removed consuming various nutrients in the wastewater via denitrifiers, which reduce nitrate to nitrite, and ultimately nitrite to nitrogen gas $$NO_3^- + 0.33CH_3OH \rightarrow NO_2^- + 0.33CO_2 + 0.67H_2O$$

$$NO2 - + 0.83CH_3OH \rightarrow 0.5N_2 + 0.5H_2O + OH^- + 0.5CO_2$$

for an overall reaction of $$NO_3^- + 0.83CH_3OH \rightarrow 0.5N_2 + 0.83CO_2 + 1.17H_2O + OH^-$$

Thus not only do the denitrifying bacteria remove ammonia and nitrates/nitrites, they remove nutrients in the process reducing the BOD of the treated wastewater.

The optimum temperature for nitrifying bacteria is 28° C. to 36° C. For these fixed film bacteria, there is no growth at 0° C. or over 54° C. The optimum pH is between 8.3 and 9.3 with no growth below pH 6.7. The required dissolved oxygen is 4.6 mg/L per 1 mg/L $NH^+_4$—N, which is supplied with a continuous supply of air injected at the center of the bottom of the dome passing upward and out the top through a center passageway between the dome tops and out the discharge hole in the top of the outermost dome. This air circulation path also draws in water to be treated from the bottom the open pond through the media and out the discharge hole providing continuous pond circulation. The number of *Nitrosomonas/Nitrobacter* bioreactors is selected to provide the ammonia nitrate/nitrite and BOD removal levels required for open stream discharge.

The average $NH_4$—N removal is 1.5 mg/L or 0.54 lbs/day. The average BOD removal is 42 mg/L or 15 lbs/day. Assuming an average air flow rate through each Poo Gloo™ type bioreactors of 10 L/min there would be an average removal rate of 0.54 lbs/day/square foot $NH_4$—N, and BOD's of 15 lbs/day. These *Nitrosomonas/Nitrobacter* bioreactors effectively multiply the surface areas of open ponds over ten fold to speed the natural reactions of the *Nitrosomonas* and *Nitrobacter* bacteria to speed the nitrogen and BOD removal processes, resulting in a smaller open pond treatment plant footprint.

As these BioDome™ type bioreactors remove BOD's along with ammonia and nitrates/nitrites, suspended solids addition of the present method is only added to expeditite the effective removal rate of ammonia and nitrates/nitrites.

In bioreactors where other types of bacteria are present, the addition of ground chemically dried solids containing a combination carbon and sulfite/sulfate compounds provides added nutrients to accelerate the growth of bacteria with widely divergent metabolisms via electron donation, as well as support platforms for biofilm growth, which shelter the bacteria from the environment. Continual addition of these carbon and sulfite/sulfate compounds thus promotes the exponential growth phase for optimal removal of nitrogen and BOD compounds in these bacteriological reactors. Thus slow bacterial growth rates of the lag phase and stationary phases are avoided via continual nutrient addition.

The chemicals used for chemical conditioning and dewatering of the suspended solids are anhydrous or hydrous sulfur dioxide, which provide rapid water/solids separation. To minimize operator exposure to sulfur dioxide, preferably an $SO_2$/sulfurous acid generator is employed. Sulfur dioxide chemical dewatering generates self-agglomerating solids, which can be more readily separated from the liquid fraction via conventional screens or drying beds without the need for polymers. Sulfur dioxide dissolves readily in water requiring little mixing. Disinfected sulfur dioxide separation of wastewater and dewatering of the resultant solids typically takes 20 minutes to an hour compared to the 24 and 48 hours separation time with present mechanical concentrators. The actual dwell time required is dependent upon the alkalinity of the wastewater, and the porosity of the separation equipment screens sand filters or bags employed. Generally, it is easier to move the solids in a 1% to 3% slurry, so the $SO_2$ may be injected into the wastewater and held the minimal time for the solids to reach the particle size in a pipeline or dwell tank to effectuate an initial separation for subsequent collection in an equipment filter screen, sand filter, or drain bag. The solids then further agglomerate and dewater more completely within the equipment screens, filters or bags. For those exceptional sludges, which may require initial agglomeration assistance, acid resistant polymers, such as cationic copolymers of acrylamide with a cationic monomer, or cationically modified acrylamide or polyamine, may be employed may be added to the $SO_2$/sulfurous acidified wastewater. Other polyquaternary amines, which are pH insensitive and function well over a broad pH, may also be employed.

Sulfur dioxide/sulfurous acid treatment in accordance with wastewater treatment methods, such as Theodore, U.S. Pat. No. 7,416,668 issued Aug. 26, 2008, and Harmon et al., U.S. Pat. No. 7,455,773 issued Nov. 25, 2008 generate an initial separated solid having a water content of 30% to 40% in approximately 5 to 10 minutes, depending on composition. These solids, after separation, are then allowed to continue to chemically dewater until a solids composition having water content as low as approximately 4% is effectuated. If the chemical exposure is extended to approximately 20 minutes to insure disinfection, odor generation during the remainder of the treatment and disposal process is avoided, and the bacterial kill prevents contamination of bioreactors. These dried solids are then pulverized to increase surface contact, when added to a bioreactor. As a wastewater treatment process byproduct, the dried solids provide a cheap source of carbon, and sulfites/bisulfites, and act as a growth substrate as described.

This rapid sulfur dioxide injection and separation generating self-agglomerating solids enables the use of much smaller gas injection and separation equipment than conventional mechanical dewatering systems. The sulfur dioxide dewatering equipment can be installed in modules, as needed. Thus, sulfur dioxide dewatering requires lower capital equipment cost investment, and has comparable or somewhat higher handling costs.

APPARATUS

Various embodiments of a wastewater treatment apparatus for disinfecting, and removing suspended solids are described in the parent applications incorporated herein by reference, and also U.S. Pat. No. 7,867,398 issued Jan. 11, 2011 by John Harmon entitled "Method to Reduce Wastewater Treatment Plant Footprints and Costs. These apparatus produce a disinfected, demetalized and phosphate free filtrate, which then has the ammonia and nitrates/nitrites and BOD's removed as described above to provide a recovered treated wastewater suitable for open stream discharge.

I claim:

1. A method to increase biological digester bacterial removal rates of phosphates, ammonia, nitrates/nitrites, and BODs from wastewater containing suspended organic solids, comprising:
   a. injecting sulfur dioxide into wastewater streams having suspended organic solids containing carbon,
   b. holding the sulfur dioxide-treated wastewater streams for the dwell time required to agglomerate the suspended organic solids while adding sulfates/sulfites/bisulfites to the carbon, and acid leach any heavy metals from the solids into the wastewater stream liquids containing phosphates, ammonia and nitrate/nitrite, and BOD compounds,
   c. separating, drying, and comminuting the suspended organic solids containing sulfates/sulfites/bisulfites to produce sulfur and carbon electron donor compounds, and
   d. adding the sulfur and carbon electron donor compounds to a bioreactor containing bacteria to provide shade cover from ultra violet light sources (UV), a growth substrate, and nutrients to maintain the bacteria in an exponential growth phase to accelerate removal of phosphates, ammonia and nitrate/nitrite, and BOD compounds.

2. A method to increase biological digester bacterial removal rates according to claim 1, including holding the sulfur dioxide-treated wastewater streams at the pH and the time required to disinfect the suspended organic solids to prevent contamination when added to the bioreactor.

3. A method to increase biological digester bacterial removal rates according to claim 1, wherein the wastewater streams constitute wastewater inflows entering a wastewater treatment plant or treated wastewater resulting from a wastewater treatment plant's processing steps.

4. A method to increase biological digester bacterial removal rates according to claim 1, wherein the bioreactor comprises an aerated *nitrosomonas/nitrobacter* bioreactor open pond containing a series of concentric half domes filled with media continuously aerated with a supply of air moving wastewater streams there through along with the addition of the comminuted suspended organic solids containing sulfates/sulfites.

5. A method to increase biological digester bacterial removal rates according to claim 1, wherein separating the solids comprises passing the sulfur dioxide-treated wastewaters with suspended organic solids through acid resistant porous bags with a mesh sized to collect and separate the sulfur dioxide-treated suspended organic solids from the sulfur dioxide-treated wastewater.

* * * * *